(12) United States Patent
Liu

(10) Patent No.: US 10,917,854 B2
(45) Date of Patent: *Feb. 9, 2021

(54) UPLINK POWER CONTROL METHOD AND APPARATUS

(71) Applicant: HUAWEI TECHNOLOGIES CO., LTD., Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,410

(22) Filed: Aug. 30, 2018

(65) Prior Publication Data
US 2018/0376430 A1 Dec. 27, 2018

Related U.S. Application Data

(63) Continuation of application No. 15/471,817, filed on Mar. 28, 2017, which is a continuation of application No. PCT/CN2014/087700, filed on Sep. 28, 2014.

(51) Int. Cl.
| | |
|---|---|
| *G08C 17/00* | (2006.01) |
| *H04W 52/14* | (2009.01) |
| *H04W 52/06* | (2009.01) |
| *H04W 52/40* | (2009.01) |
| *H04B 7/0456* | (2017.01) |
| *H04L 5/00* | (2006.01) |
| *H04W 52/08* | (2009.01) |

(Continued)

(52) U.S. Cl.
CPC ........ *H04W 52/146* (2013.01); *H04B 7/0456* (2013.01); *H04L 5/005* (2013.01); *H04W 52/06* (2013.01); *H04W 52/08* (2013.01); *H04W 52/40* (2013.01); *H04B 17/327* (2015.01); *H04W 76/27* (2018.02)

(58) Field of Classification Search
CPC .. H04W 52/02; H04W 52/0203; H04W 84/12
See application file for complete search history.

(56) References Cited

U.S. PATENT DOCUMENTS

| | | | | |
|---|---|---|---|---|
| 2005/0037796 A1* | 2/2005 | Tsai | ..................... | H04W 52/325 455/522 |
| 2006/0018287 A1* | 1/2006 | Walton | ................. | H04B 7/0413 370/334 |

(Continued)

FOREIGN PATENT DOCUMENTS

| | | |
|---|---|---|
| CN | 102006657 A | 4/2011 |
| CN | 102271389 A | 12/2011 |

(Continued)

*Primary Examiner* — Siren Wei
(74) *Attorney, Agent, or Firm* — Slater Matsil, LLP

(57) ABSTRACT

An uplink power control method and an device is provided. The uplink power control method includes: sending a configured measurement pilot, wherein the measurement pilot is corresponding to information about a precoding matrix; and sending a configured power control parameter, wherein the power control parameter is corresponding to the configured measurement pilot, and the power control parameter is used to control transmit power of a terminal device in a serving cell. According to the embodiments of the present invention, accuracy of uplink power control is improved.

23 Claims, 4 Drawing Sheets

Receive a measurement pilot configured by a network device, where the measurement pilot is corresponding to information about a precoding matrix — 201

Receive a power control parameter configured by the network device, where the power control parameter is corresponding to the configured measurement pilot, and the power control parameter is used by user equipment UE to control transmit power of the UE in a serving cell — 202

(51) Int. Cl.
*H04B 17/327* (2015.01)
*H04W 76/27* (2018.01)

(56) References Cited

U.S. PATENT DOCUMENTS

| | | | |
|---|---|---|---|
| 2007/0042799 A1 | 2/2007 | Jubin et al. | |
| 2007/0197254 A1* | 8/2007 | Borran | H04W 52/243 455/522 |
| 2009/0042593 A1 | 2/2009 | Yavuz et al. | |
| 2009/0232239 A1* | 9/2009 | Ko | H04L 5/005 375/260 |
| 2010/0246705 A1* | 9/2010 | Shin | H04W 52/10 375/267 |
| 2011/0158345 A1 | 6/2011 | Chul et al. | |
| 2011/0182201 A1* | 7/2011 | Pajukoski | H04W 52/22 370/252 |
| 2011/0310987 A1 | 12/2011 | Lee et al. | |
| 2012/0176939 A1* | 7/2012 | Qu | H04L 5/0023 370/255 |
| 2013/0065631 A1 | 3/2013 | Lu | |
| 2013/0258884 A1* | 10/2013 | Xu | H04W 52/243 370/252 |
| 2014/0185481 A1 | 7/2014 | Seol et al. | |
| 2014/0226551 A1* | 8/2014 | Ouchi | H04W 52/40 370/311 |
| 2015/0031410 A1* | 1/2015 | Lim | H04W 52/244 455/522 |
| 2015/0222340 A1* | 8/2015 | Nagata | H04L 25/0224 375/267 |
| 2017/0201950 A1 | 7/2017 | Liu | |

FOREIGN PATENT DOCUMENTS

| | | |
|---|---|---|
| CN | 102468947 A | 5/2012 |
| CN | 102695261 A | 9/2012 |
| CN | 103002554 A | 3/2013 |
| CN | 103096448 A | 5/2013 |
| CN | 103369654 A | 10/2013 |
| CN | 105745975 A | 7/2016 |
| EP | 2747495 A1 | 6/2014 |
| EP | 2770785 B1 | 6/2016 |
| WO | 2010107885 A2 | 9/2010 |

\* cited by examiner

UPLINK POWER CONTROL METHOD AND APPARATUS

CROSS-REFERENCE TO RELATED APPLICATIONS

This application is a continuation of U.S. patent application Ser. No. 15/471,817, filed on Mar. 28, 2017, which is a continuation of International Application No. PCT/CN2014/087700, filed on Sep. 28, 2014. All of the afore-mentioned patent applications are hereby incorporated by reference in their entireties.

TECHNICAL FIELD

Embodiments of the present invention relate to communications technologies, and in particular, to an uplink power control method and an apparatus.

BACKGROUND

A multi-antenna multiple input multiple output (MIMO for short) technology has been widely used in a wireless communications system to improve a system capacity and ensure cell coverage. For example, multi-antenna-based transmit diversity, open-loop/closed-loop spatial multiplexing, and demodulation reference signal (DMRS for short) based multi-stream transmission are used in a downlink of a Long Term Evolution (LTE for short) system. DMRS-based multi-stream transmission is a main transmission mode in an LTE-Advanced (LTE-A for short) system and a subsequent LTE system. To further improve performance of a multi-antenna system, a two-dimensional antenna configuration is being researched in the release Rel-12 standard, that is, an antenna is placed in both a horizontal direction and a vertical direction, so that beamforming can be performed in both a horizontal direction and a vertical direction, and beamforming performed in both a horizontal direction and a vertical direction is referred to as three-dimensional beamforming. FIG. 1A is a schematic diagram of a two-dimensional antenna configuration.

Furthermore, in addition to the two-dimensional antenna configuration, three-dimensional user equipment distribution is introduced in the current Rel-12 standard. That is, user equipment may be not only horizontally distributed, but also vertically distributed on the first floor to the eighth floor of a high-rise building. Location coordinates of each user equipment include both a horizontal coordinate and a vertical coordinate. When it is assumed that a height of user equipment is 1.5 meters and a height of each floor is 3 meters, a height range of user equipments on the first floor to the eighth floor is from 1.5 meters to 22.5 meters. If there is a higher-rise building (for example, the building has 20 to 30 floors), a height of user equipment on the top floor may reach 88.5 meters. In a 3D urban macro (UMa for short) scenario and a 3D urban micro (UMi for short) scenario that are researched in the Rel-12 standard, a path loss of each link between a base station and user equipment UE is in direct proportion to a height of the user equipment, and therefore, a path loss difference between user equipment on the top floor and user equipment on the first floor or on the ground is tens of dB. In addition to a path loss, large-scale fading on the link between the base station and the user equipment includes shadow fading, a penetration loss, an antenna gain, and the like. However, a shadow fading difference, a penetration loss difference, an antenna gain difference, or the like between the user equipment on the first floor and the user equipment on the top floor is far less than a path loss difference. FIG. 1B is a distribution diagram of large-scale fading of user equipment on the eighth floor and user equipment on the first floor in a 3D UMi scenario. In FIG. 1B, the user equipment on the first floor is served by a precoding beam that points at a 12 degree downtilt angle, and the user equipment on the eighth floor is served by a precoding beam that points at a −6 degree uptilt angle. It can be learned from FIG. 1B that a minimum large-scale fading difference between the user equipment on the eighth floor and the user equipment on the first floor is around 10-20 dB.

A prior-art problem is that because an uplink power control mechanism in the current LTE standard is a mechanism based on compensation for large-scale fading, and both a power control parameter and an adjustment value that are related to the large-scale fading are at a cell level, large-scale fading compensation and corresponding power control cannot be performed on different users or different user groups in a cell. Consequently, there is a problem of inaccuracy in a current uplink power control method used in a new 3D scenario.

SUMMARY

Embodiments of the present invention provide an uplink power control method and an apparatus, so as to resolve a prior-art problem of inaccuracy in a current uplink power control method used in a new 3D scenario.

According to a first aspect, an embodiment of the present invention provides an uplink power control method, including receiving a measurement pilot configured by a network device, where the measurement pilot is corresponding to information about a precoding matrix and receiving a power control parameter configured by the network device, where the power control parameter is corresponding to the configured measurement pilot, and the power control parameter is used by user equipment UE to control transmit power of the UE in a serving cell.

With reference to the first aspect, in a first possible implementation manner of the first aspect, that the power control parameter is corresponding to the configured measurement pilot includes: power control parameter configurations of UEs that receive a same measurement pilot configuration are the same.

With reference to the first aspect, in a second possible implementation manner of the first aspect, the power control parameter includes target receive power, a path loss compensation factor, and a transmit format compensation term of the UE.

With reference to the first aspect, or the first or the second possible implementation manner of the first aspect, in a third possible implementation manner of the first aspect, the UE controls, according to the power control parameter, total physical uplink shared channel PUSCH transmit power of the UE to meet the requirement that at a transmission moment i, if the UE only performs PUSCH transmission but does not perform physical uplink control channel PUCCH transmission in a serving cell c, $$P_{PUSCH,c}(i) = \min\left\{\begin{array}{l} P_{CMAX,c}(i), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{array}\right\},$$

or at a transmission moment i, if the UE performs PUSCH transmission and also performs PUCCH transmission in a serving cell c, $$P_{PUSCH,c}(i) = \min\left\{\begin{array}{l}10\log_{10}(P_{CMAX,c}(i) - P_{PUCCH}(i)),\\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i)\end{array}\right\},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$PL_c$ is a path loss measurement value, based on reference signal received power RSRP, of a terminal;

$\Delta_{TF,c,k}(i) = 10\log_{10}((2^{BPRE \cdot K_{s,k}} - 1) \cdot \beta_{offset}^{PUSCH})$ is a power adjustment value in different modulation and coding schemes, where when the configured measurement pilot received by the UE is the $k^{th}$ measurement pilot in the serving cell, $K_{s,k}$ is the power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

With reference to the third possible implementation manner of the first aspect, in a fourth possible implementation manner of the first aspect, the UE controls, according to the power control parameter, total physical uplink control channel PUCCH transmit power of the UE to meet the following:

at a transmission moment i, total transmit power of the UE in a serving cell c is:

$$P_{PUCCH}(i) = \min\left\{\begin{array}{l}P_{CMAX,c}(i),\\ P_{0\_PUCCH,k} + PL_c + h(n_{CQI}, n_{HARQ}, n_{SR}) + \Delta_{F\_PUCCH}(F) + \Delta_{TxD}(F') + g(i)\end{array}\right\},$$

where $P_{0\_PUCCH,k}$ includes $P_{O\_NOMINAL\_PUCCH,k}$ and $P_{O\_UE\_PUCCH,k}$, and when the configured measurement pilot received by the UE is a $k^{th}$ measurement pilot in the serving cell, $P_{O\_NOMINAL\_PUCCH,k}$ represents a power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and g(i) is a closed-loop power control adjustment value and is determined according to a power control command sent by the network device.

With reference to the third or the fourth possible implementation manner of the first aspect, in a fifth possible implementation manner of the first aspect, the UE controls, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{\begin{array}{l}P_{CMAX,c}(i),\\ P_{SRS\_OFFSET,c}(m) + 10\log_{10}(M_{SRS,c}) + P_{O\_PUSCH,c,k}(j) + \alpha_{c,k}(j) \cdot PL_c + f_c(i)\end{array}\right\},$$

where $P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the configured measurement pilot received by the UE is a $k^{th}$ measurement pilot in the serving cell, $P_{O\_nominal\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

According to a second aspect, an embodiment of the present invention provides an uplink power control method, including:

receiving, by user equipment UE, configuration information, sent by a network device, of a user-specific power control parameter, where a power control parameter configured by the network device includes target receive power, a path loss compensation factor, and a transmit format compensation term of the UE; and controlling, by the UE, transmit power of the UE in a serving cell according to the power control parameter.

With reference to the second aspect, in a first possible implementation manner of the second aspect, the UE controls, according to the power control parameter, total physical uplink shared channel PUSCH transmit power of the UE to meet the following:

at a transmission moment i, if the UE only performs PUSCH transmission but does not perform physical uplink control channel PUCCH transmission in a serving cell c, $$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\},$$

or at a transmission moment i, if the UE performs PUSCH transmission and
also performs PUCCH transmission in a serving cell c, $$P_{PUSCH,c}(i) = \min\left\{\begin{array}{l} 10\log_{10}(P_{CMAX,c}(i) - P_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the UE-specific power control parameter and is semi-statically configured by using higher layer RRC signaling;

$PL_c$ is a path loss measurement value, based on reference signal received power RSRP, of a terminal;

$\Delta_{TF,c}(i) = 10\log_{10}((2^{BPRE \cdot K_s} - 1) \cdot \beta_{offset}^{PUSCH})$ is a power adjustment value in different modulation and coding schemes, where $K_s$ is the UE-specific power control parameter and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

With reference to the first possible implementation manner of the second aspect, in a second possible implementation manner of the second aspect, the UE controls, according to the power control parameter, total physical uplink control channel PUCCH transmit power of the UE to meet the following:

at a transmission moment i, total transmit power of the UE in a serving cell c is:

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array}\right\},$$

where $P_{0\_PUCCH}$ includes $P_{O\_NOMINAL\_PUCCH}$ and $P_{O\_UE\_PUCCH}$, where $P_{O\_NOMINAL\_PUCCH}$ represents the UE-specific power control parameter and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

With reference to the first or the second possible implementation manner of the second aspect, in a third possible implementation manner of the second aspect, the UE controls, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{\begin{array}{l} P_{CMAX,c}(i), \\ P_{SRS\_OFFSET,c}(m) + 10\log_{10}(M_{SRS,c}) + P_{O\_PUSCH,c}(j) + \alpha_c(j) \cdot PL_c + f_c(i) \end{array}\right\},$$

where $P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the user-specific power control parameter and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

According to a third aspect, an embodiment of the present invention provides an uplink power control method, including:

sending, by a network device, a configured measurement pilot to user equipment UE, where the measurement pilot is corresponding to information about a precoding matrix; and sending, by the network device, a configured power control parameter to the user equipment UE, where the power control parameter is corresponding to the configured measurement pilot, and the power control parameter is used by the user equipment UE to control transmit power of the UE in a serving cell.

With reference to the third aspect, in a first possible implementation manner of the third aspect, that the power control parameter is corresponding to the configured measurement pilot includes: power control parameter configurations of UEs that receive a same measurement pilot configuration are the same.

With reference to the third aspect, in a second possible implementation manner of the third aspect, the power control parameter includes target receive power, a path loss compensation factor, and a transmit format compensation term of the UE.

With reference to the third aspect, or the first or the second possible implementation manner of the third aspect, in a third possible implementation manner of the third aspect, the UE controls, according to the power control parameter, total physical uplink shared channel PUSCH transmit power of the UE to meet the following:

at a transmission moment i, if the UE only performs PUSCH transmission but does not perform physical uplink control channel PUCCH transmission in a serving cell c, $$P_{PUSCH,c}(i) = \min\left\{\begin{array}{l} P_{CMAX,c}(i), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{array}\right\},$$

or at a transmission moment i, if the UE performs PUSCH transmission and also performs PUCCH transmission in a serving cell c, $$P_{PUSCH,c}(i) = \min\left\{\begin{array}{l} 10\log_{10}(P_{CMAX,c}(i) - P_{PUCCH}(i)), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{array}\right\},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

$$P_{SRS,c}(i) = \min \begin{Bmatrix} P_{CMAX,c}(i), \\ P_{SRS\_OFFSET,c}(m) + 10\log_{10}(M_{SRS,c}) + P_{O\_PUSCH,c,k}(j) + \alpha_{c,k}(j) \cdot PL_c + f_c(i) \end{Bmatrix},$$

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$PL_c$ is a path loss measurement value, based on reference signal received power RSRP, of a terminal;

$\Delta_{TF,c,k}(i) = 10 \log_{10}((2^{BPRE \cdot K_{s,k}} - 1) \cdot \beta_{offset}^{PUSCH})$ is a power adjustment value in different modulation and coding schemes, where when the configured measurement pilot received by the UE is the $k^{th}$ measurement pilot in the serving cell, $K_{s,k}$ is the power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

With reference to the third possible implementation manner of the third aspect, in a fourth possible implementation manner of the third aspect, the UE controls, according to the power control parameter, total physical uplink control channel PUCCH transmit power of the UE to meet the following:

at a transmission moment i, total transmit power of the UE in a serving cell c is:

$\Delta_{TxD}(F')$ is a parameter related to a quantity of antenna ports for PUCCH sending and a PUCCH transmission mode; and g(i) is a closed-loop power control adjustment value and is determined according to a power control command sent by the network device.

With reference to the third or the fourth possible implementation manner of the third aspect, in a fifth possible implementation manner of the third aspect, the UE controls, according to the power control parameter, total sounding reference signal SRS transmit power to meet the following:

at a transmission moment i, total sounding reference signal SRS transmit power of the UE in a serving cell c is:

where $P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the configured measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

According to a fourth aspect, an embodiment of the present invention provides an uplink power control method, including:

sending, by a network device, configuration information of a UE-specific power control parameter to user equipment UE, where a power control parameter configured by the network device includes target receive power, a path loss compensation factor, and a transmit format compensation $$P_{PUCCH}(i) = \min \begin{Bmatrix} P_{CMAX,c}(i), \\ P_{0\_PUCCH,k} + PL_c + h(n_{CQI}, n_{HARQ}, n_{SR}) + \Delta_{F\_PUCCH}(F) + \Delta_{TxD}(F') + g(i) \end{Bmatrix},$$

where $P_{0\_PUCCH,k}$ includes $P_{O\_NOMINAL\_PUCCH,k}$ and $P_{O\_UE\_PUCCH,k}$, and when the configured measurement pilot received by the UE is a $k^{th}$ measurement pilot in the serving cell, $P_{O\_NOMINAL\_PUCCH,k}$ represents a power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

term of the UE, and the power control parameter is used by the UE to control transmit power of the UE in a serving cell according to the power control parameter.

With reference to the fourth aspect, in a first possible implementation manner of the fourth aspect, the UE controls, according to the power control parameter, total physical uplink shared channel PUSCH transmit power of the UE to meet the following:

at a transmission moment i, if the UE only performs PUSCH transmission but does not perform PUCCH transmission in a serving cell c, $$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \alpha_c(j)\cdot PL_c + \Delta_{TF,c}(i) + f_c(i)\end{array}\right\},$$

or at a transmission moment i, if the UE performs PUSCH transmission and also performs PUCCH transmission in a serving cell c, $$P_{PUSCH,c}(i) = \min\left\{\begin{array}{l}10\log_{10}(P_{CMAX,c}(i) - P_{PUCCH}(i)),\\ 10\log_{10}(M_{PUSCH,c}(i)) + P_{O\_PUSCH,c}(j) + \alpha_c(j)\cdot PL_c + \Delta_{TF,c}(i) + f_c(i)\end{array}\right\},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the UE-specific power control parameter and is semi-statically configured by using higher layer RRC signaling;

$PL_c$ is a path loss measurement value, based on reference signal received power RSRP, of a terminal;

$\Delta_{TF,c}(i) = 10\log_{10}((2^{BPRE\cdot K_s}-1)\cdot\beta_{offset}^{PUSCH})$ is a power adjustment value in different modulation and coding schemes, where $K_s$ is the UE-specific power control parameter and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

With reference to the first possible implementation manner of the fourth aspect, in a second possible implementation manner of the fourth aspect, the UE controls, according to the power control parameter, total physical uplink control channel PUCCH transmit power of the UE to meet the following:

at a transmission moment i, total transmit power of the UE in a serving cell c is:

$$P_{PUCCH}(i) = \min\left\{\begin{array}{l}P_{CMAX,c}(i),\\ P_{0\_PUCCH} + PL_c + h(n_{CQI}, n_{HARQ}, n_{SR}) + \Delta_{F\_PUCCH}(F) + \Delta_{TxD}(F') + g(i)\end{array}\right\},$$

where $P_{0\_PUCCH}$ includes $P_{O\_NOMINAL\_PUCCH}$ and $P_{O\_UE\_PUCCH}$, where $P_{O\_NOMINAL\_PUCCH}$ represents the UE-specific power control parameter and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

With reference to the first or the second possible implementation manner of the fourth aspect, in a third possible implementation manner of the fourth aspect, the UE controls, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{\begin{array}{l}P_{CMAX,c}(i),\\ P_{SRS\_OFFSET,c}(m) + 10\log_{10}(M_{SRS,c}) + P_{O\_PUSCH,c}(j) + \alpha_c(j)\cdot PL_c + f_c(i)\end{array}\right\},$$

where $P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the user-specific power control parameter and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

According to a fifth aspect, an embodiment of the present invention provides user equipment UE, including:

a receiving module, configured to receive a measurement pilot configured by a network device, where the measurement pilot is corresponding to information about a precoding matrix; where the receiving module is further configured to receive a power control parameter configured by the network device, where the power control parameter is corresponding to the configured measurement pilot, and the power control parameter is used by the user equipment UE to control transmit power of the UE in a serving cell.

With reference to the fifth aspect, in a first possible implementation manner of the fifth aspect, that the power control parameter is corresponding to the configured measurement pilot includes: power control parameter configurations of UEs that receive a same measurement pilot configuration are the same.

With reference to the fifth aspect, in a second possible implementation manner of the fifth aspect, the power control parameter includes target receive power, a path loss compensation factor, and a transmit format compensation term of the UE.

With reference to the fifth aspect or the first or the second possible implementation manner of the fifth aspect, in a third possible implementation manner of the fifth aspect, the UE further includes:

a control module, configured to control, according to the power control parameter, total physical uplink shared channel PUSCH transmit power of the UE to meet the following:

at a transmission moment i, if the UE only performs PUSCH transmission but does not perform physical uplink control channel PUCCH transmission in a serving cell c, where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$PL_c$ is a path loss measurement value, based on reference signal received power RSRP, of a terminal;

$\Delta_{TF,c,k}(i)=10\log_{10}((2^{BPRE \cdot K_{s,k}}-1) \cdot \beta_{offset}^{PUSCH})$ is a power adjustment value in different modulation and coding schemes, where when the configured measurement pilot received by the UE is the $k^{th}$ measurement pilot in the serving cell, $K_{s,k}$ is the power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

With reference to the third possible implementation manner of the fifth aspect, in a fourth possible implementation manner of the fifth aspect, the control module is further configured to control, according to the power control param $$P_{PUSCH,c}(i) = \min\left\{\begin{array}{l}P_{CMAX,c}(i),\\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i)\end{array}\right\},$$

or at a transmission moment i, if the UE performs PUSCH transmission and also performs PUCCH transmission in a serving cell c, eter, total physical uplink control channel PUCCH transmit power of the UE to meet the following:

at a transmission moment i, total transmit power of the UE in a serving cell c is:

$$P_{PUSCH,c}(i) = \min\left\{\begin{array}{l}10\log_{10}(P_{CMAX,c}(i) - P_{PUCCH}(i)),\\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i)\end{array}\right\},$$

$$P_{PUCCH}(i) = \min\left\{ \begin{array}{l} P_{CMAX,c}(i), \\ P_{0\_PUCCH,k} + PL_c + h(n_{CQI}, n_{HARQ}, n_{SR}) + \Delta_{F\_PUCCH}(F) + \Delta_{TxD}(F') + g(i) \end{array} \right\},$$

where $P_{0\_PUCCH,k}$ includes $P_{O\_NOMINAL\_PUCCH,k}$ and $P_{O\_UE\_PUCCH,k}$, and when the configured measurement pilot received by the UE is a $k^{th}$ measurement pilot in the serving cell, $P_{O\_NOMINAL\_PUCCH,k}$ represents a power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and g(i) is a closed-loop power control adjustment value and is determined according to a power control command sent by the network device.

With reference to the third or the fourth possible implementation manner of the fifth aspect, in a fifth possible implementation manner of the fifth aspect, the control module is further configured to control, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{ \begin{array}{l} P_{CMAX,c}(i), \\ P_{SRS\_OFFSET,c}(m) + 10\log_{10}(M_{SRS,c}) + P_{O\_PUSCH,c,k}(j) + \alpha_{c,k}(j) \cdot PL_c + f_c(i) \end{array} \right\},$$

where $P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the configured measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

According to a sixth aspect, an embodiment of the present invention provides user equipment UE, including:

a receiving module, configured to receive configuration information, sent by a network device, of a user-specific power control parameter, where a power control parameter configured by the network device includes target receive power, a path loss compensation factor, and a transmit format compensation term of the UE; and a control module, configured to control transmit power of the UE in a serving cell according to the power control parameter.

With reference to the sixth aspect, in a first possible implementation manner of the sixth aspect, the control module is specifically configured to control, according to the power control parameter, total physical uplink shared channel PUSCH transmit power of the UE to meet the following:

at a transmission moment i, if the UE only performs PUSCH transmission but does not perform physical uplink control channel PUCCH transmission in a serving cell c, $$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\},$$

or at a transmission moment i, if the UE performs PUSCH transmission and also performs PUCCH transmission in a serving cell c, $$P_{PUSCH,c}(i) = \min\left\{\begin{array}{l}10\log_{10}(P_{CMAX,c}(i) - P_{PUCCH}(i)),\\ 10\log_{10}(M_{PUSCH,c}(i)) + P_{O\_PUSCH,c}(j) + \alpha_c(j) \cdot PL_c + \Delta_{TF,c}(i) + f_c(i)\end{array}\right\},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the UE-specific power control parameter and is semi-statically configured by using higher layer RRC signaling;

$PL_c$ is a path loss measurement value, based on reference signal received power RSRP, of a terminal;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and g(i) is a closed-loop power control adjustment value and is determined according to a power control command sent by the network device.

With reference to the first or the second possible implementation manner of the sixth aspect, in a third possible implementation manner of the sixth aspect, the control module is specifically configured to control, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{\begin{array}{l}P_{CMAX,c}(i),\\ P_{SRS\_OFFSET,c}(m) + 10\log_{10}(M_{SRS,c}) + P_{O\_PUSCH,c}(j) + \alpha_c(j) \cdot PL_c + f_c(i)\end{array}\right\},$$

$\Delta_{TF,c}(i) = 10\log_{10}((2^{BPRE \cdot K_s} - 1) \cdot \beta_{offset}^{PUSCH})$ is a power adjustment value in different modulation and coding schemes, where $K_s$ is the UE-specific power control parameter and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

With reference to the first possible implementation manner of the sixth aspect, in a second possible implementation manner of the sixth aspect, the control module is specifically configured to control, according to the power control parameter, total physical uplink control channel PUCCH transmit power of the UE to meet the following:

at a transmission moment i, total transmit power of the UE in a serving cell c is:

where $P_{O\_PUSCH,c}(j)$ includes $P_{O\_NOMINAL\_PUSCH,c}(j)$ and $P_{O\_UE\_PUSCH,c,k}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the user-specific power control parameter and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

According to a seventh aspect, an embodiment of the present invention provides a network device, including:

a sending module, configured to send a configured measurement pilot to user equipment UE, where the measurement pilot is corresponding to information about a precoding matrix; where $$P_{PUCCH}(i) = \min\left\{\begin{array}{l}P_{CMAX,c}(i),\\ P_{0\_PUCCH} + PL_c + h(n_{CQI}, n_{HARQ}, n_{SR}) + \Delta_{F\_PUCCH}(F) + \Delta_{TxD}(F') + g(i)\end{array}\right\},$$

where $P_{0\_PUCCH}$ includes $P_{O\_NOMINAL\_PUCCH}$ and $P_{O\_UE\_PUCCH}$, where $P_{O\_NOMINAL\_PUCCH}$ represents the UE-specific power control parameter and is semi-statically configured by using RRC signaling;

the sending module is further configured to send a configured power control parameter to the user equipment UE, where the power control parameter is corresponding to the configured measurement pilot, and the power control parameter is used by the user equipment UE to control transmit power of the UE in a serving cell.

With reference to the seventh aspect, in a first possible implementation manner of the seventh aspect, that the power control parameter is corresponding to the configured measurement pilot includes: power control parameter configurations of UEs that receive a same measurement pilot configuration are the same.

With reference to the seventh aspect, in a second possible implementation manner of the seventh aspect, the power control parameter includes target receive power, a path loss compensation factor, and a transmit format compensation term of the UE.

According to an eighth aspect, an embodiment of the present invention provides a network device, including:

a sending module, configured to send configuration information of a user-specific power control parameter to user equipment UE, where a power control parameter configured by the network device includes target receive power, a path loss compensation factor, and a transmit format compensation term of the UE, and the power control parameter is used by the UE to control transmit power of the UE in a serving cell according to the power control parameter.

According to a ninth aspect, an embodiment of the present invention provides user equipment UE, including:

a processor and a memory, where the memory stores an execution instruction; and when the user equipment runs, the processor communicates with the memory, and the processor executes the execution instruction to enable the user equipment to perform the method according to either the first aspect or the second aspect.

According to a tenth aspect, an embodiment of the present invention provides a network device, including:

a processor and a memory, where the memory stores an execution instruction; and when the network device runs, the processor communicates with the memory, and the processor executes the execution instruction to enable the user equipment to perform the method according to either the third aspect or the fourth aspect.

According to the uplink power control method and the apparatus provided in the embodiments of the present invention, a measurement pilot configured by a network device is received, where the measurement pilot is corresponding to information about a precoding matrix; and a power control parameter configured by the network device is received, where the power control parameter is corresponding to the configured measurement pilot, and the power control parameter is used by user equipment UE to control transmit power of the UE in a serving cell; or user equipment UE receives configuration information, sent by a network device, of a user-specific power control parameter, where a power control parameter configured by the network device includes target receive power, a path loss compensation factor, and a transmit format compensation term of the UE; and the UE controls transmit power of the UE in a serving cell according to the power control parameter. In this way, an uplink power control mechanism based on compensation for large-scale fading is implemented, and both a power control parameter and an adjustment value that are related to the large-scale fading are at a user equipment group level or a user equipment level, thereby improving accuracy of uplink power control, and resolving a prior-art problem of inaccuracy in a current uplink power control method used in a new 3D scenario.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1A:
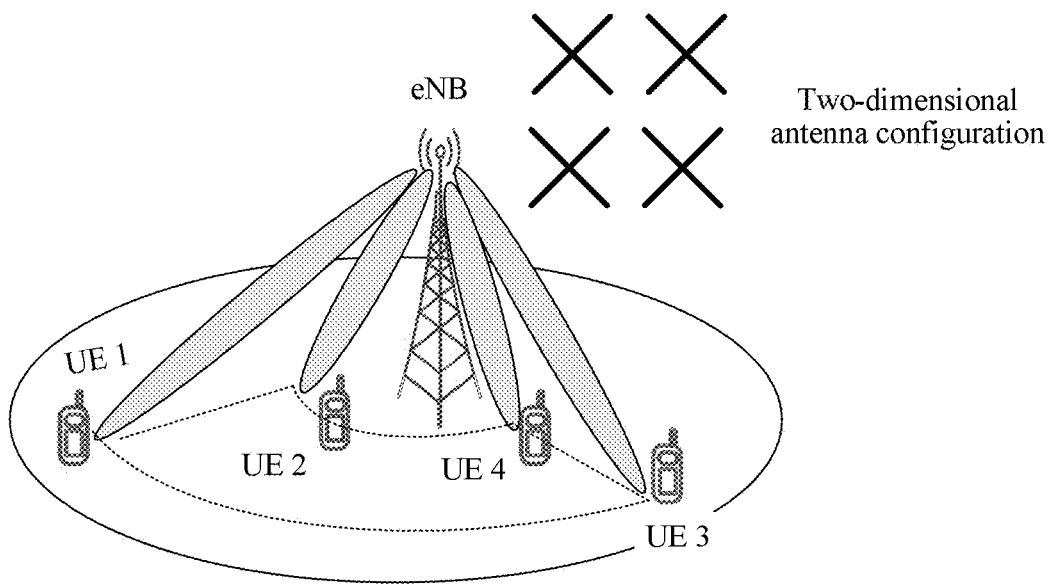
FIG. 1A is a schematic diagram of a two-dimensional antenna configuration.
Figure 1B:
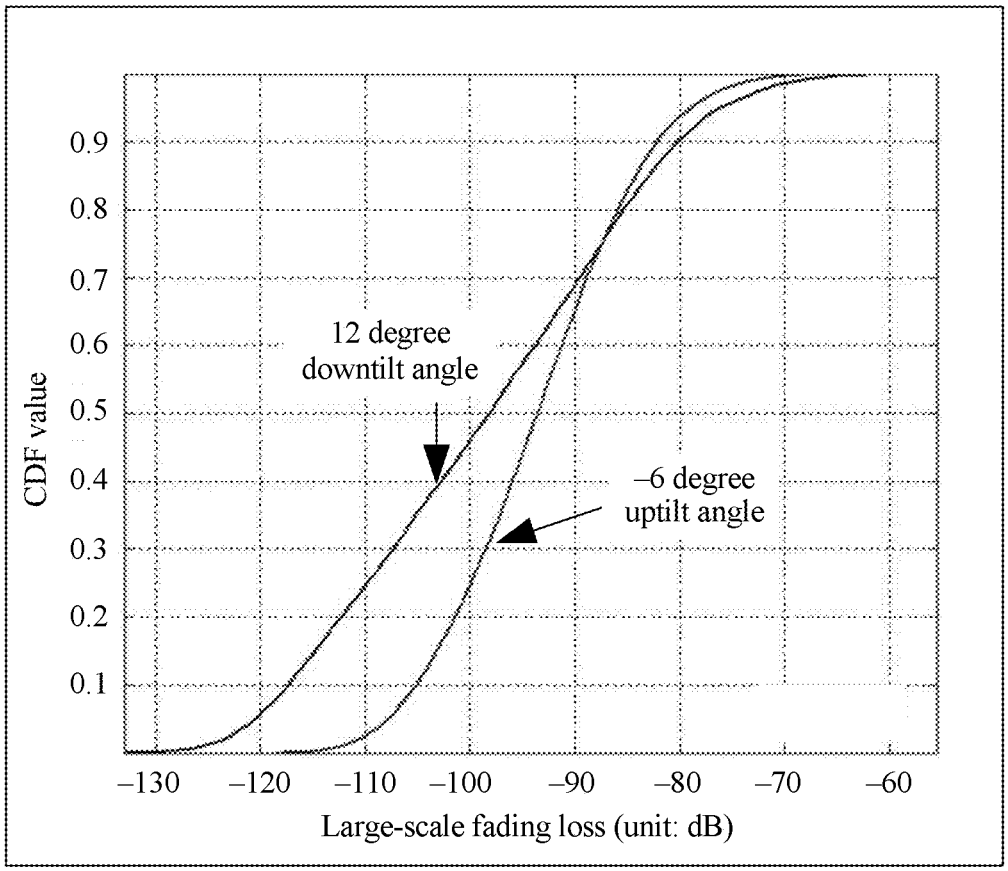
FIG. 1B is a distribution diagram of large-scale fading of user equipment on the eighth floor and user equipment on the first floor in a 3D UMi scenario.
Figure 2:
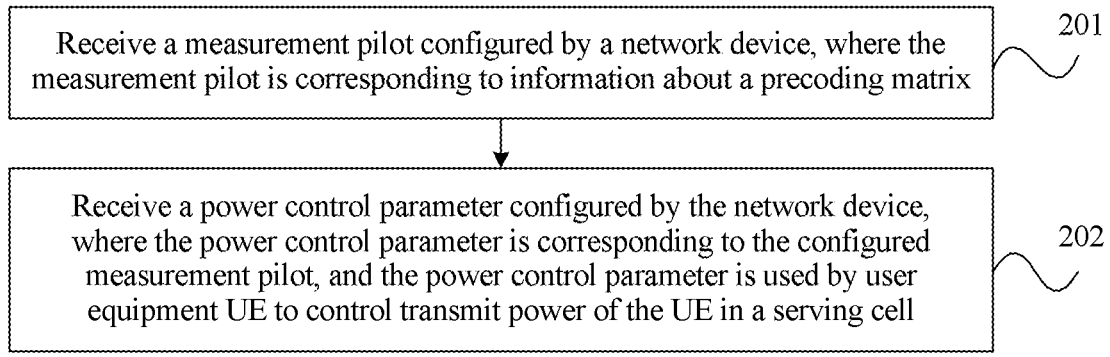
FIG. 2 is a flowchart of Embodiment 1 of an uplink power control method according to the present invention.

FIG. 2 is a flowchart of Embodiment 1 of an uplink power control method according to the present invention. This embodiment may be executed by user equipment, and the solution in this embodiment is used by a network device and the user equipment to perform uplink power control. As shown in FIG. 2, the method in this embodiment may include the following steps.

Step 201: Receive a measurement pilot configured by the network device, where the measurement pilot is corresponding to information about a precoding matrix.

Step 202: Receive a power control parameter configured by the network device, where the power control parameter is corresponding to the configured measurement pilot, and the power control parameter is used by the user equipment UE to control transmit power of the UE in a serving cell.

Specifically, the user equipment UE receives the measurement pilot configured by the network device, where the measurement pilot is corresponding to the information about a precoding matrix; and receives the power control parameter configured by the network device, where the power control parameter is corresponding to the measurement pilot. The UE controls the transmit power of the UE in the serving cell according to the power control parameter.

Optionally, that the power control parameter is corresponding to the configured measurement pilot includes: power control parameter configurations of UEs that receive a same measurement pilot configuration are the same.

Optionally, the power control parameter includes target receive power, a path loss compensation factor, and a transmit format compensation term of the UE.

The power control parameter may be delivered by a base station by using a multicast radio network temporary identifier RNTI or a user-specific RNTI.

In this embodiment of the present invention, for a feature that different user equipment groups in each cell have different large-scale fading in a new 3D scenario or a high frequency, user equipments in each cell may be grouped for power control, that is, each cell is further divided into several "virtual cells", and each "virtual cell" is corresponding to one group of user equipments. For example, in a cell, all user equipments that are located on the first floor or on the ground are grouped into one group, and this group of user equipments are corresponding to a measurement pilot configuration of a beam that points at 12 degrees; and all user equipments that are located on the eighth floor are grouped into one group, and this group of user equipments are corresponding to a measurement pilot configuration of a beam that points at −6 degrees. Therefore, users in a measurement pilot configuration may be grouped into one group and are corresponding to one "virtual cell". Each "virtual cell" has an independent "cell"-level large-scale power control parameter. The "cell"-level large-scale power control parameter refers to all large-scale cell-specific power control parameters in a power control mechanism.

According to the uplink power control method and the apparatus in the embodiments of the present invention, a measurement pilot configured by a network device is received, where the measurement pilot is corresponding to information about a precoding matrix; and a power control parameter configured by the network device is received, where the power control parameter is corresponding to the configured measurement pilot, and the power control parameter is used by user equipment UE to control transmit power of the UE in a serving cell. In this way, an uplink power control mechanism based on compensation for large-scale fading is implemented, and both a power control parameter and an adjustment value that are related to the large-scale fading are at a user equipment group level, that is, different user equipment groups are corresponding to different measurement pilots and different power control parameters, thereby improving accuracy of uplink power control, and resolving a prior-art problem of inaccuracy in a current uplink power control method used in a new 3D scenario.

The following uses a specific embodiment to describe in detail the technical solution in the method embodiment shown in FIG. 2.

In Embodiment 2 of an uplink power control method in the present invention, the UE controls, according to the power control parameter, total physical uplink shared channel PUSCH transmit power of the UE to meet the following:

at a transmission moment i, if the UE only performs PUSCH transmission but does not perform physical uplink control channel PUCCH transmission in a serving cell c, $$P_{PUSCH,c}(i) = \min \begin{cases} P_{CMAX,c}(i), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{cases},$$

or
at a transmission moment i, if the UE performs PUSCH transmission and also performs PUCCH transmission in a serving cell c, $$P_{PUSCH,c}(i) = \min \begin{cases} 10\log_{10}(P_{CMAX,c}(i) - P_{PUCCH}(i)), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{cases},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; when the measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell; and a definition of $P_{O\_UE\_PUSCH,c,k}(j)$ is the same as that of $P_{O\_UE\_PUSCH,c}(j)$ in the 3GPP protocol;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$PL_c$ is a path loss measurement value, based on reference signal received power (RSRP for short), of a terminal;

$\Delta_{TF,c,k}(i)=10\log_{10}((2^{BPRE \cdot K_{s,k}}-1) \cdot \beta_{offset}^{PUSCH})$ is a power adjustment value in different modulation and coding schemes, where when the configured measurement pilot received by the UE is the $k^{th}$ measurement pilot in the serving cell, $K_{s,k}$ is the power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

Specifically, the UE controls, according to the power control parameter, the total physical uplink shared channel (PUSCH for short) transmit power of the UE to meet the following formula:

at the transmission moment i, if the UE only performs PUSCH transmission but does not perform PUCCH transmission in the serving cell c, where $P_{O\_PUSCH,c,k}(j)$ in the foregoing formula includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the measurement pilot received by the UE is the $k^{th}$ measurement pilot in the serving cell, $P_{O\_NOMINAL\_PUSCH,c,k}(j)$ is the power control parameter corresponding to the $k^{th}$ measurement pilot, where k is an integer ranging from 1 to M, and M is the total quantity of different measurement pilots configured in the serving cell, that is, parameters $P_{O\_PUSCH,c,k}(j)$ are different for user equipments with different measurement pilot configurations; and when the configured measurement pilot received by the UE is the $k^{th}$ measurement pilot in the serving cell, $\alpha_{c,k}(j)$ represents the path loss compensation factor parameter in the power control parameter corresponding to the $k^{th}$ measurement pilot and is semi-statically configured by using higher layer RRC signaling, that is, parameters $\alpha_{c,k}(j)$ are different for user equipments with different measurement pilot configurations.

A variable j is related to a PUSCH scheduling grant manner. When PUSCH transmission is granted by means of semi-static scheduling, j=0; when PUSCH transmission is granted by means of dynamic scheduling, j=1; and when PUSCH transmission is granted by means of random access response, j=2. A value of $P_{O\_PUSCH,c,k}(j)$ is determined according to parameters that are configured by a higher layer in the serving cell c and that are corresponding to different values of j.

$\Delta_{TF,c,k}(i)=10\log_{10}((2^{BPRE \cdot K_{s,k}}-1) \cdot \beta_{offset}^{PUSCH})$ is the power adjustment value for the different modulation and coding schemes, where when the configured measurement pilot received by the UE is the $k^{th}$ measurement pilot in the serving cell, $K_{s,k}$ is the power control parameter corresponding to the $k^{th}$ measurement pilot and is semi-statically configured by using higher layer RRC signaling, $\beta_{offset}^{PUSCH}$ is the parameter configured by the higher layer, and BPRE is obtained by calculating the quantity of bits carried in the data of the UE and the quantity of resource elements REs allocated to the data of the UE, that is, parameters $\Delta_{TF,c,k}(i)$ are different for user equipments with different measurement pilot configurations.

A definition of $P_{PUCCH}(i)$ is the same as that of $P_{PUCCH}(i)$ in the 3GPP protocol.

Optionally, the UE controls, according to the power control parameter, total physical uplink control channel $$P_{PUSCH,c}(i) = \min\left\{\begin{array}{l}P_{CMAX,c}(i), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i)\end{array}\right\},$$

or at the transmission moment i, if the UE performs PUSCH transmission and also performs PUCCH transmission in the serving cell c, (PUCCH for short) transmit power of the UE to meet the following:

at a transmission moment i, total transmit power of the UE in a serving cell c is:

$$P_{PUSCH,c}(i) = \min\left\{\begin{array}{l}10\log_{10}(P_{CMAX,c}(i) - P_{PUCCH}(i)), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i)\end{array}\right\},$$

$$P_{PUCCH}(i) = \min\begin{cases} P_{CMAX,c}(i), \\ P_{0\_PUCCH,k} + PL_c + h(n_{CQI}, n_{HARQ}, n_{SR}) + \Delta_{F\_PUCCH}(F) + \Delta_{TxD}(F') + g(i) \end{cases},$$

where $P_{0\_PUCCH,k}$ includes $P_{O\_NOMINAL\_PUCCH,k}$ and $P_{O\_UE\_PUCCH,k}$, and when the configured measurement pilot received by the UE is a $k^{th}$ measurement pilot in the serving cell, $P_{O\_NOMINAL\_PUCCH,k}$ represents a power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

Specifically, the UE controls, according to the power control parameter, the total physical uplink control channel PUCCH transmit power of the UE to meet the following formula:

at the transmission moment i, the total transmit power of the UE in the serving cell c is:

$$P_{PUCCH}(i) = \min\begin{cases} P_{CMAX,c}(i), \\ P_{0\_PUCCH,k} + PL_c + h(n_{CQI}, n_{HARQ}, n_{SR}) + \Delta_{F\_PUCCH}(F) + \Delta_{TxD}(F') + g(i) \end{cases},$$

where $P_{0\_PUCCH,k}$ includes $P_{O\_NOMINAL\_PUCCH,k}$ and $P_{O\_UE\_PUCCH,k}$, and when the configured measurement pilot received by the UE is the $k^{th}$ measurement pilot in the serving cell, $P_{O\_NOMINAL\_PUCCH,k}$ represents the power control parameter corresponding to the $k^{th}$ measurement pilot and is semi-statically configured by using RRC signaling, that is, parameters $P_{0\_PUCCH,k}$ are different for user equipments with different measurement pilot configurations; and a definition of $P_{0\_PUCCH,k}$ is the same as that of $P_{0\_PUCCH}$ in the 3GPP protocol, a definition of $P_{O\_NOMINAL\_PUCCH,k}$ is the same as that of $P_{O\_NOMINAL\_PUCCH}$ in the 3GPP protocol, and a definition of $P_{O\_UE\_PUCCH,k}$ is the same as that of $P_{O\_UE\_PUCCH}$ in the 3GPP protocol.

Optionally, the UE controls, according to the power control parameter, total sounding reference signal SRS transmit power to meet the following:

at a transmission moment i, total sounding reference signal SRS transmit power of the UE in a serving cell c is:

where $P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the configured measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

$$P_{SRS,c}(i) = \min\begin{cases} P_{CMAX,c}(i), \\ P_{SRS\_OFFSET,c}(m) + 10\log_{10}(M_{SRS,c}) + P_{O\_PUSCH,c,k}(j) + \alpha_{c,k}(j) \cdot PL_c + f_c(i) \end{cases},$$

Specifically, the UE controls, according to the power control parameter, the total sounding reference signal SRS transmit power to meet the following:

at the transmission moment i, the total sounding reference signal SRS transmit power of the UE in the serving cell c is:

$$P_{SRS,c}(i) = \min\begin{cases} P_{CMAX,c}(i), \\ P_{SRS\_OFFSET,c}(m) + 10\log_{10}(M_{SRS,c}) + P_{O\_PUSCH,c,k}(j) + \alpha_{c,k}(j) \cdot PL_c + f_c(i) \end{cases},$$

where $P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the configured measurement pilot received by the UE is the $k^{th}$ measurement pilot in the serving cell, $P_{O\_NOMINAL\_PUSCH,c,k}(j)$ is the power control parameter corresponding to the $k^{th}$ measurement pilot, where k is an integer ranging from 1 to M, and M is the total quantity of different measurement pilots configured in the serving cell, that is, parameters $P_{O\_PUSCH,c,k}(j)$ are different for user equipments with different measurement pilot configurations; and when the configured measurement pilot received by the UE is the $k^{th}$ measurement pilot in the serving cell, $\alpha_{c,k}(j)$ represents the path loss compensation factor parameter in the power control parameter corresponding to the $k^{th}$ measurement pilot and is semi-statically configured by using higher layer RRC signaling, that is, parameters $\alpha_{c,k}(j)$ are different for user equipments with different measurement pilot configurations.

In the foregoing formula, m is specified in the 3GPP protocol, and m is related to a trigger type of SRS transmission. When the trigger type is 0, m=0, and when the trigger type is 1, m=1.

Each measurement pilot configuration is corresponding to one precoding matrix (corresponding to a beam in a particular direction and with a particular width), and different configured measurement pilots have different precoding matrixes. For example, in a 3D UMi scenario, a height of a base station is lower than a height of a high-rise building user. In this case, the base station configures, for a low-floor user, a measurement pilot that point at a 12 degree downtilt angle (that is, the measurement pilot is corresponding to a precoding matrix that points at 12 degrees), and configures, for a high-floor user whose height is higher than that of the base station, a measurement pilot that point at a −6 degree uptilt angle (that is, the measurement pilot is corresponding to a precoding matrix that points at −6 degrees).

In one possible implementation manner of grouping user equipments, user equipments configured with a same measurement pilot are grouped into one group. For example, all user equipments configured with a measurement pilot that points at a 12 degree downtilt angle are grouped into one group, and all user equipments configured with a measurement pilot that points at a −6 degree uptilt angle are grouped into one group.

Generally, cell-specific parameters in transmit power of other uplink channels and signals such as a PUCCH, an SRS, and a physical random access channel (PRACH for short) can be similarly extended into parameters that are specific to a measurement pilot configuration or a user equipment group.

Figure 3:
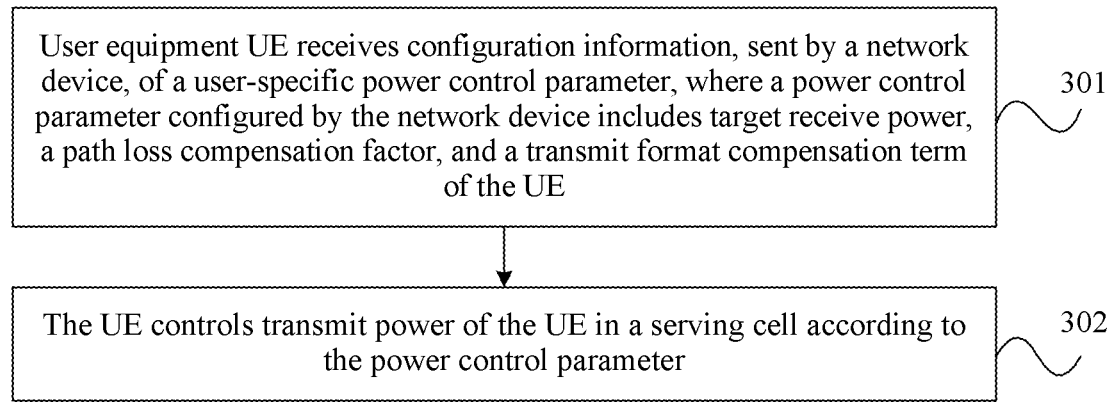
FIG. 3 is a flowchart of Embodiment 3 of an uplink power control method according to the present invention.

FIG. 3 is a flowchart of Embodiment 3 of an uplink power control method according to the present invention. This embodiment may be executed by user equipment, and the solution in this embodiment is used by a network device and the user equipment to perform uplink power control. As shown in FIG. 3, the method in this embodiment may include the following steps.

Step 301: The user equipment UE receives configuration information, sent by the network device, of a user-specific power control parameter, where a power control parameter configured by the network device includes target receive power, a path loss compensation factor, and a transmit format compensation term of the UE.

Step 302: The UE controls transmit power of the UE in a serving cell according to the power control parameter.

Specifically, the user equipment UE receives the configuration information, sent by the network device, of the user-specific power control parameter, where the power control parameter configured by the network device includes the target receive power, the path loss compensation factor, and the transmit format compensation term of the UE; and the UE controls the transmit power of the UE in the serving cell according to the power control parameter.

Further, to set large-scale power control parameters for different user equipment groups in each cell in a new 3D scenario or a high frequency, each user equipment may have an independent "cell"-level large-scale power control parameter, that is, a user-specific power control parameter. The "cell"-level large-scale power control parameter refers to all large-scale cell-specific power control parameters in a power control mechanism.

Optionally, the UE controls, according to the power control parameter, total physical uplink shared channel PUSCH transmit power of the UE to meet the following:

at a transmission moment i, if the UE only performs PUSCH transmission but does not perform physical uplink control channel PUCCH transmission in a serving cell c, $$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix},$$

or at a transmission moment i, if the UE performs PUSCH transmission and also performs PUCCH transmission in a serving cell c, $$P_{PUSCH,c}(i) = \min\begin{Bmatrix} 10\log_{10}(P_{CMAX,c}(i) - P_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the UE-specific power control parameter and is semi-statically configured by using higher layer RRC signaling;

$PL_c$ is a path loss measurement value, based on reference signal received power RSRP, of a terminal;

$\Delta_{TF,c}(i) = 10 \log_{10}((2^{BPRE \cdot K_s} - 1) \cdot \beta_{offset}^{PUSCH})$ is a power adjustment value in different modulation and coding schemes, where $K_s$ is the UE-specific power control parameter and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

Specifically, the UE controls, according to the power control parameter, the total physical uplink shared channel PUSCH transmit power of the UE to meet the following formula:

at the transmission moment i, if the UE only performs PUSCH transmission but does not perform PUCCH transmission in the serving cell c, $$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\},$$

or at the transmission moment i, if the UE performs PUSCH transmission and also performs PUCCH transmission in the serving cell c, $$P_{PUSCH,c}(i) = \min \left\{ \begin{array}{l} 10\log_{10}(P_{CMAX,c}(i) - P_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\},$$

where the target receive power $P_{O\_PUSCH,c}(j)$, the path loss compensation factor $\alpha_c(j)$, and the transmit format compensation term $\Delta_{TF,c}(i)$ of the UE are user-specific power control parameters, that is, parameter values are different for different user equipments;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents the path loss compensation factor parameter in the UE-specific power control parameter and is semi-statically configured by using higher layer RRC signaling; and $\Delta_{TF,c}(i) = 10 \log_{10}((2^{BPRE \cdot K_s} - 1) \cdot \beta_{offset}^{PUSCH})$ is the power adjustment value for the different modulation and coding schemes, where $K_s$ is the UE-specific power control parameter and is semi-statically configured by using higher layer RRC signaling, $\beta_{offset}^{PUSCH}$ is the parameter configured by the higher layer, and BPRE is obtained by calculating the quantity of bits carried in the data of the UE and the quantity of resource elements REs allocated to the data of the UE.

Optionally, the UE controls, according to the power control parameter, total physical uplink control channel PUCCH transmit power of the UE to meet the following:

at a transmission moment i, total transmit power of the UE in a serving cell c is:

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\},$$

where $P_{0\_PUCCH}$ includes $P_{O\_NOMINAL\_PUCCH}$ and $P_{O\_UE\_PUCCH}$, where $P_{O\_NOMINAL\_PUCCH}$ represents the UE-specific power control parameter and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

Specifically, the UE controls, according to the power control parameter, the total physical uplink control channel PUCCH transmit power of the UE to meet the following:

at the transmission moment i, the total transmit power of the UE in the serving cell c is:

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array}\right\},$$

where $P_{0\_PUCCH}$ is a user-specific power control parameter and includes $P_{O\_NOMINAL\_PUCCH}$ and $P_{O\_UE\_PUCCH}$, where $P_{O\_NOMINAL\_PUCCH}$ represents the UE-specific power control parameter and is semi-statically configured by using RRC signaling, that is, parameter values are different for different user equipments.

Optionally, the UE controls, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{\begin{array}{l} P_{CMAX,c}(i), \\ P_{SRS\_OFFSET,c}(m) + 10\log_{10}(M_{SRS,c}) + P_{O\_PUSCH,c}(j) + \alpha_c(j) \cdot PL_c + f_c(i) \end{array}\right\},$$

where $P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the user-specific power control parameter and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

Specifically, the UE controls, according to the power control parameter, the total sounding reference signal SRS transmit power to meet the following:

at the transmission moment i, the total sounding reference signal SRS transmit power of the UE in the serving cell c is:

$$P_{SRS,c}(i) = \min\left\{\begin{array}{l} P_{CMAX,c}(i), \\ P_{SRS\_OFFSET,c}(m) + 10\log_{10}(M_{SRS,c}) + P_{O\_PUSCH,c}(j) + \alpha_c(j) \cdot PL_c + f_c(i) \end{array}\right\},$$

where the target receive power $P_{O\_PUSCH,c}(j)$ and the path loss compensation factor $\alpha_c(j)$ of the UE are user-specific power control parameters, that is, parameter values are different for different user equipments;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling; and $\alpha_c(j)$ represents the path loss compensation factor parameter in the user-specific power control parameter and is semi-statically configured by using higher layer RRC signaling.

According to the uplink power control method and the apparatus provided in the embodiments of the present invention, user equipment UE receives configuration information, sent by a network device, of a user-specific power control parameter, where a power control parameter configured by the network device includes target receive power, a path loss compensation factor, and a transmit format compensation term of the UE; and the UE controls transmit power of the UE in a serving cell according to the power control parameter. In this way, an uplink power control mechanism based on compensation for large-scale fading is implemented, and both a power control parameter and an adjustment value that are related to the large-scale fading are at a user equipment level, that is, different user equipments may be corresponding to different power control parameters, thereby improving accuracy of uplink power control, and resolving a prior-art problem of inaccuracy in a current uplink power control method used in a new 3D scenario.

Figure 4:
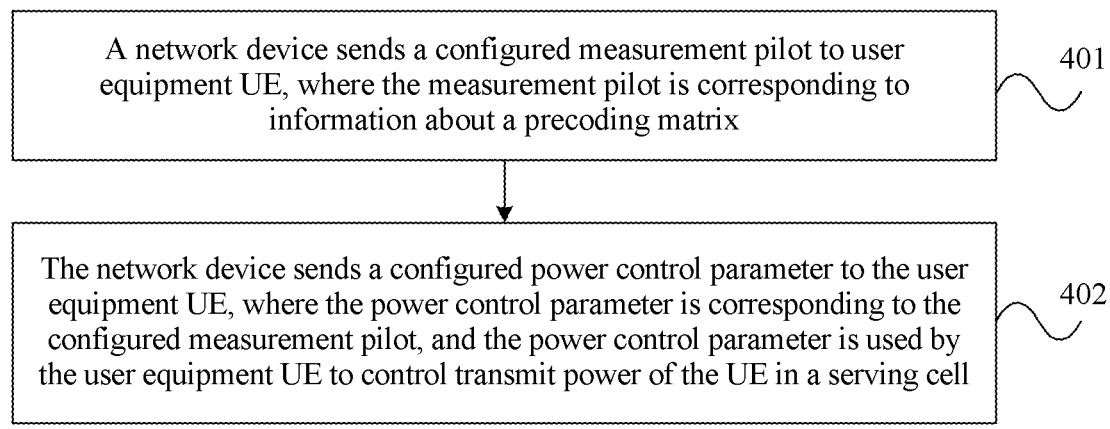
FIG. 4 is a flowchart of Embodiment 4 of an uplink power control method according to the present invention.

FIG. 4 is a flowchart of Embodiment 4 of an uplink power control method according to the present invention. This embodiment may be executed by a network device, and the solution in this embodiment is used by the network device and user equipment to perform uplink power control. As shown in FIG. 4, the method in this embodiment may include the following steps.

Step 401: The network device sends a configured measurement pilot to the user equipment UE, where the measurement pilot is corresponding to information about a precoding matrix.

Step 402: The network device sends a configured power control parameter to the user equipment UE, where the power control parameter is corresponding to the configured measurement pilot, and the power control parameter is used by the user equipment UE to control transmit power of the UE in a serving cell.

Specifically, the network device sends the configured measurement pilot to the user equipment UE, where the measurement pilot is corresponding to the information about a precoding matrix; and sends the configured power control parameter to the user equipment UE, where the power control parameter is corresponding to the configured measurement pilot, and the power control parameter is used by the user equipment UE to control the transmit power of the UE in the serving cell.

Optionally, that the power control parameter is corresponding to the configured measurement pilot includes: power control parameter configurations of UEs that receive a same measurement pilot configuration are the same.

Optionally, the power control parameter includes target receive power, a path loss compensation factor, and a transmit format compensation term of the UE.

Optionally, the UE controls, according to the power control parameter, total physical uplink shared channel PUSCH transmit power of the UE to meet the following:

at a transmission moment i, if the UE only performs PUSCH transmission but does not perform PUCCH transmission in a serving cell c, $$P_{PUSCH,c}(i) = \min\left\{\begin{array}{l} P_{CMAX,c}(i), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{array}\right\},$$

or at a transmission moment i, if the UE performs PUSCH transmission and also performs PUCCH transmission in a serving cell c, $$P_{PUSCH,c}(i) = \min\left\{\begin{array}{l} 10\log_{10}(P_{CMAX,c}(i) - P_{PUCCH}(i)), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{array}\right\},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$PL_c$ is a path loss measurement value, based on reference signal received power RSRP, of a terminal;

$\Delta_{TF,c,k}(i)=10 \log_{10}((2^{BPRE \cdot K_{s,k}}-1)\cdot \beta_{offset}^{PUSCH})$ is a power adjustment value in different modulation and coding schemes, where when the configured measurement pilot received by the UE is the $k^{th}$ measurement pilot in the serving cell, $K_{s,k}$ is the power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

Optionally, the UE controls, according to the power control parameter, total physical uplink control channel PUCCH transmit power of the UE to meet the following:

at a transmission moment i, total transmit power of the UE in a serving cell c is:

$$P_{PUCCH}(i) = \min\left\{\begin{array}{l} P_{CMAX,c}(i), \\ P_{0\_PUCCH,k} + PL_c + h(n_{CQI}, n_{HARQ}, n_{SR}) + \Delta_{F\_PUCCH}(F) + \Delta_{TxD}(F') + g(i) \end{array}\right\},$$

where $P_{O\_PUCCH,k}$ includes $P_{O\_NOMINAL\_PUCCH,k}$ and $P_{O\_UE\_PUCCH,k}$, and when the configured measurement pilot received by the UE is a $k^{th}$ measurement pilot in the serving cell, $P_{O\_NOMINAL\_PUCCH,k}$ represents a power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

Optionally, the UE controls, according to the power control parameter, total sounding reference signal SRS transmit power to meet the following:

at a transmission moment i, total sounding reference signal SRS transmit power of the UE in a serving cell c is:

$$P_{SRS,c}(i) = \min\begin{cases} P_{CMAX,c}(i), \\ P_{SRS\_OFFSET,c}(m) + 10\log_{10}(M_{SRS,c}) + P_{O\_PUSCH,c,k}(j) + \alpha_{c,k}(j) \cdot PL_c + f_c(i) \end{cases},$$

where $P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the configured measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

In Embodiment 5 of an uplink power control method in the present invention, this embodiment may be executed by a network device, and the solution in this embodiment is used by the network device and user equipment to perform uplink power control. The method in this embodiment may include:

sending, by the network device, configuration information of a UE-specific power control parameter to the user equipment UE, where a power control parameter configured by the network device includes target receive power, a path loss compensation factor, and a transmit format compensation term of the UE, and the power control parameter is used by the UE to control transmit power of the UE in a serving cell according to the power control parameter.

Optionally, the UE controls, according to the power control parameter, total physical uplink shared channel PUSCH transmit power of the UE to meet the following:

at a transmission moment i, if the UE only performs PUSCH transmission but does not perform PUCCH transmission in a serving cell c, where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the UE-specific power control parameter and is semi-statically configured by using higher layer RRC signaling;

$PL_c$ is a path loss measurement value, based on reference signal received power RSRP, of a terminal;

$\Delta_{TF,c}(i) = 10 \log_{10}((2^{BPRE \cdot K_s} - 1) \cdot \beta_{offset}^{PUSCH})$ is a power adjustment value in different modulation and coding schemes, where $K_s$ is the UE-specific power control parameter and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

$$P_{PUSCH,c}(i) = \min\begin{cases} P_{CMAX,c}(i), \\ 10\log_{10}(M_{PUSCH,c}(i)) + P_{O\_PUSCH,c,k}(j) + \alpha_{c,k}(j) \cdot PL_c + \Delta_{TF,c}(i) + f_c(i) \end{cases},$$

or at a transmission moment i, if the UE performs PUSCH transmission and also performs PUCCH transmission in a serving cell c, Optionally, the UE controls, according to the power control parameter, total physical uplink control channel PUCCH transmit power of the UE to meet the following:

at a transmission moment i, total transmit power of the UE in a serving cell c is:

$$P_{PUSCH,c}(i) = \min\begin{cases} 10\log_{10}(P_{CMAX,c}(i) - P_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases},$$

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array}\right\},$$

where $P_{0\_PUCCH}$ includes $P_{O\_NOMINAL\_PUCCH}$ and $P_{O\_UE\_PUCCH}$, where $P_{O\_NOMINAL\_PUCCH}$ represents the UE-specific power control parameter and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

Optionally, the UE controls, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{\begin{array}{l} P_{CMAX,c}(i), \\ P_{SRS\_OFFSET,c}(m) + 10\log_{10}(M_{SRS,c}) + P_{O\_PUSCH,c}(j) + \alpha_c(j) \cdot PL_c + f_c(i) \end{array}\right\},$$

where $P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the user-specific power control parameter and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

Figure 5:
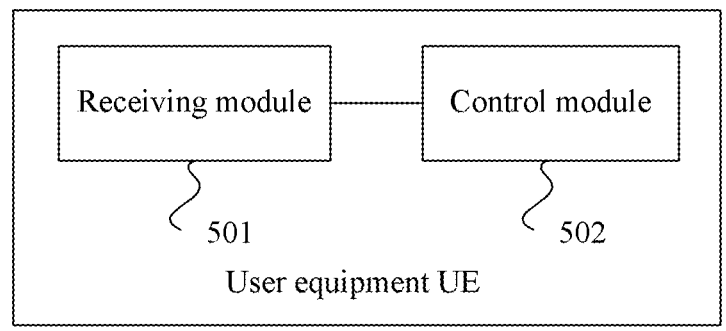
FIG. 5 is a schematic structural diagram of Embodiment 1 of user equipment UE according to the present invention.

FIG. 5 is a schematic structural diagram of Embodiment 1 of user equipment UE according to the present invention. As shown in FIG. 5, the user equipment UE in this embodiment may include a receiving module 501. The receiving module 501 is configured to receive a measurement pilot configured by a network device, where the measurement pilot is corresponding to information about a precoding matrix.

The receiving module 501 is further configured to receive a power control parameter configured by the network device, where the power control parameter is corresponding to the configured measurement pilot, and the power control parameter is used by the user equipment UE to control transmit power of the UE in a serving cell.

Specifically, the receiving module 501 of the user equipment UE receives the measurement pilot configured by the network device, where the measurement pilot is corresponding to the information about a precoding matrix; and receives the power control parameter configured by the network device, where the power control parameter is corresponding to the measurement pilot, and the power control parameter is used by the UE to control the transmit power of the UE in the serving cell according to the power control parameter.

Optionally, that the power control parameter is corresponding to the configured measurement pilot includes: power control parameter configurations of UEs that receive a same measurement pilot configuration are the same.

Optionally, the power control parameter includes target receive power, a path loss compensation factor, and a transmit format compensation term of the UE.

Optionally, the user equipment UE in this embodiment further includes:

a control module 502, configured to control, according to the power control parameter, total physical uplink shared channel PUSCH transmit power of the UE to meet the following:

at a transmission moment i, if the UE only performs PUSCH transmission but does not perform PUCCH transmission in a serving cell c, $$P_{PUSCH,c}(i) = \min\left\{\begin{array}{l} P_{CMAX,c}(i), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{array}\right\},$$

or at a transmission moment i, if the UE performs PUSCH transmission and also performs PUCCH transmission in a serving cell c, $$P_{PUSCH,c}(i) = \min\left\{\begin{array}{l} 10\log_{10}(P_{CMAX,c}(i) - P_{PUCCH}(i)), \\ 10\log_{10}(M_{PUSCH,c}(i)) + P_{O\_PUSCH,c,k}(j) + \alpha_{c,k}(j) \cdot PL_c + \Delta_{TF,c,k}(i) + f_c(i) \end{array}\right\},$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$PL_c$ is a path loss measurement value, based on reference signal received power RSRP, of a terminal;

$\Delta_{TF,c,k}(i)=10\log_{10}((2^{BPRE \cdot K_{s,k}}-1) \cdot \beta_{offset}^{PUSCH})$ is a power adjustment value in different modulation and coding schemes, where when the configured measurement pilot received by the UE is the $k^{th}$ measurement pilot in the serving cell, $K_{s,k}$ is the power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

Optionally, the control module 502 is further configured to control, according to the power control parameter, total physical uplink control channel PUCCH transmit power of the UE to meet the following:

at a transmission moment i, total transmit power of the UE in a serving cell c is:

$$P_{PUCCH}(i) = \min\left\{ \begin{array}{l} P_{CMAX,c}(i), \\ P_{0\_PUCCH,k} + PL_c + h(n_{CQI}, n_{HARQ}, n_{SR}) + \Delta_{F\_PUCCH}(F) + \Delta_{TxD}(F') + g(i) \end{array} \right\},$$

where $P_{0\_PUCCH,k}$ includes $P_{O\_NOMINAL\_PUCCH,k}$ and $P_{O\_UE\_PUCCH,k}$, and when the configured measurement pilot received by the UE is a $k^{th}$ measurement pilot in the serving cell, $P_{O\_NOMINAL\_PUCCH,k}$ represents a power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

Optionally, the control module 502 is further configured to control, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{ \begin{array}{l} P_{CMAX,c}(i), \\ P_{SRS\_OFFSET,c}(m) + 10\log_{10}(M_{SRS,c}) + P_{0\_PUSCH,c,k}(j) + \alpha_{c,k}(j) \cdot PL_c + f_c(i) \end{array} \right\},$$

where $P_{O\_PUSCH,c,k}(j)$ includes $P_{O\_NOMINAL\_PUSCH,c,k}(j)$ and $P_{O\_UE\_PUSCH,c,k}(j)$, and is used to represent the target receive power of the UE and is semi-statically configured by using higher layer RRC signaling; and when the configured measurement pilot received by the UE is a $k^{th}$ measurement pilot in the serving cell, $P_{O\_NOMINAL\_PUSCH,c,k}(j)$ is a power control parameter corresponding to the $k^{th}$ measurement pilot, where k is an integer ranging from 1 to M, and M is a total quantity of different measurement pilots configured in the serving cell;

when the configured measurement pilot received by the UE is the $k^{th}$ measurement pilot in the serving cell, $\alpha_{c,k}(j)$ represents a path loss compensation factor parameter in the power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

The user equipment UE in this embodiment may be configured to execute the technical solution in the method embodiment shown in FIG. 2. Implementation principles and technical effects thereof are similar and are not repeatedly described herein.

In Embodiment 2 of user equipment UE in the present invention, the user equipment UE in this embodiment is based on the structure of the user equipment UE shown in FIG. 5. In this embodiment, the receiving module 501 is configured to receive configuration information, sent by a network device, of a user-specific power control parameter, where a power control parameter configured by the network device includes target receive power, a path loss compensation factor, and a transmit format compensation term of the UE.

The control module 502 is configured to control transmit power of the UE in a serving cell according to the power control parameter.

Specifically, the receiving module 501 of the user equipment UE receives the configuration information, sent by the network device, of the user-specific power control parameter, where the power control parameter configured by the network device includes the target receive power, the path loss compensation factor, and the transmit format compensation term of the UE; and the control module 502 of the user equipment controls the transmit power of the UE in the serving cell according to the power control parameter.

Optionally, the control module 502 is specifically configured to control, according to the power control parameter, total physical uplink shared channel PUSCH transmit power of the UE to meet the following:

at a transmission moment i, if the UE only performs PUSCH transmission but does not perform PUCCH transmission in a serving cell c, $$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\}$$

or at a transmission moment i, if the UE performs PUSCH transmission and also performs PUCCH transmission in a serving cell c, $$P_{PUSCH,c}(i) = \min\left\{\begin{array}{l} 10\log_{10}(P_{CMAX,c}(i) - P_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\}$$

where $P_{CMAX,c}(i)$ is maximum transmit power of the UE in the serving cell c; and $M_{PUSCH,c}(i)$ is a quantity, in a unit of physical resource block PRB, of PUSCH scheduling resource blocks of the UE at the transmission moment i, where i is an integer greater than or equal to 0, and c is an integer greater than or equal to 0;

$P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the UE-specific power control parameter and is semi-statically configured by using higher layer RRC signaling;

$PL_c$ is a path loss measurement value, based on reference signal received power RSRP, of a terminal;

$\Delta_{TF,c}(i) = 10\log_{10}((2^{BPRE \cdot K_s} - 1) \cdot \beta_{offset}^{PUSCH})$ is a power adjustment value in different modulation and coding schemes, where $K_s$ is the UE-specific power control parameter and is semi-statically configured by using higher layer RRC signaling, $\beta_{offset}^{PUSCH}$ is a parameter configured by a higher layer, and BPRE is obtained by calculating a quantity of bits carried in data of the UE and a quantity of resource elements REs allocated to the data of the UE; and $f_c(i)$ is a closed-loop power adjustment amount and is a feedback value that is quantized by a receive end according to a receive error or a measurement error.

Optionally, the control module 502 is specifically configured to control, according to the power control parameter, total physical uplink control channel PUCCH transmit power of the UE to meet the following:

at a transmission moment i, total transmit power of the UE in a serving cell c is:

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\}$$

where $P_{0\_PUCCH}$ includes $P_{O\_NOMINAL\_PUCCH}$ and $P_{O\_UE\_PUCCH}$, where $P_{O\_NOMINAL\_PUCCH}$ represents the UE-specific power control parameter and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

Optionally, the control module 502 is specifically configured to control, according to the power control parameter, total sounding reference signal SRS transmit power to meet the following:

at a transmission moment i, total sounding reference signal SRS transmit power of the UE in a serving cell c is:

$$P_{SRS,c}(i) = \min\left\{\begin{array}{l} P_{CMAX,c}(i), \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array}\right\}$$

where $P_{O\_PUSCH,c}(j)$ includes $P_{O\_NOMINAL\_PUSCH,c}(j)$ and $P_{O\_UE\_PUSCH,c}(j)$, and is used to represent the target receive power of the UE and is semi-statically configured by using higher layer RRC signaling, where $P_{O\_NOMINAL\_PUSCH,c}(j)$ is the UE-specific power control parameter and is semi-statically configured by using RRC signaling;

$\alpha_c(j)$ represents a path loss compensation factor parameter in the user-specific power control parameter and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the UE.

The user equipment UE in this embodiment may be configured to execute the technical solution in the method embodiment shown in FIG. 3. An implementation principle and a technical effect of this embodiment are similar to those of the method embodiment shown in FIG. 3 and are not repeatedly described herein.

Figure 6:
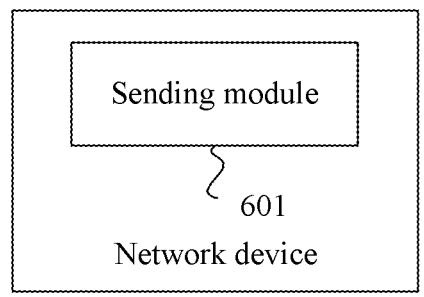
FIG. 6 is a schematic structural diagram of Embodiment 1 of a network device according to the present invention.

FIG. 6 is a schematic structural diagram of Embodiment 1 of a network device according to the present invention. As shown in FIG. 6, the network device in this embodiment may include a sending module 601. The sending module 601 is configured to send a configured measurement pilot to user equipment UE, where the measurement pilot is corresponding to information about a precoding matrix.

The sending module 601 is further configured to send a configured power control parameter to the user equipment UE, where the power control parameter is corresponding to the configured measurement pilot, and the power control parameter is used by the user equipment UE to control transmit power of the UE in a serving cell.

Optionally, that the power control parameter is corresponding to the configured measurement pilot includes: power control parameter configurations of UEs that receive a same measurement pilot configuration are the same.

Optionally, the power control parameter includes target receive power, a path loss compensation factor, and a transmit format compensation term of the UE.

The network device in this embodiment may be configured to execute the technical solution in the method embodiment shown in FIG. 4. An implementation principle and a technical effect of this embodiment are similar to those of the method embodiment shown in FIG. 4 and are not repeatedly described herein.

In Embodiment 2 of a network device in the present invention, the network device in this embodiment is based on the structure of the network device shown in FIG. 6. In this embodiment, the sending module 601 is further configured to send configuration information of a user-specific power control parameter to user equipment UE, where a power control parameter configured by the network device includes target receive power, a path loss compensation factor, and a transmit format compensation term of the UE, and the power control parameter is used by the UE to control transmit power of the UE in a serving cell according to the power control parameter.

The network device in this embodiment may be configured to execute the technical solution in the fifth method embodiment. An implementation principle and a technical effect of this embodiment are similar to those of the fifth method embodiment and are not repeatedly described herein.

Figure 7:
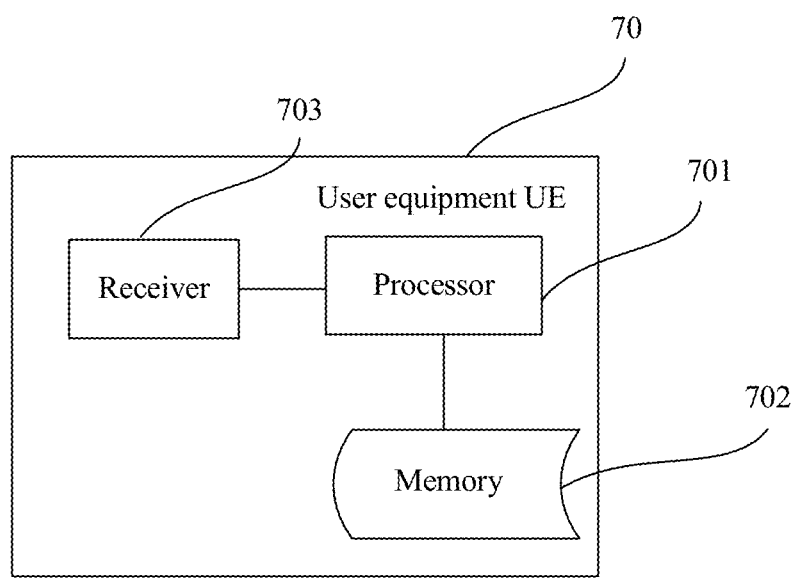
FIG. 7 is a schematic structural diagram of Embodiment 2 of user equipment UE according to the present invention.

FIG. 7 is a schematic structural diagram of Embodiment 2 of user equipment UE according to the present invention. As shown in FIG. 7, user equipment UE 70 provided in this embodiment includes a processor 701 and a memory 702. The user equipment UE 70 may further include a receiver 703. The receiver 703 may be connected to the processor 701. The receiver 704 is configured to receiver data or information. The memory 702 stores an execution instruction. When the user equipment UE 70 runs, the processor 701 communicates with the memory 702, and the processor 701 invokes the execution instruction in the memory 702, so as to execute the technical solution of the uplink power control method provided in any one of Embodiment 1, Embodiment 2, or Embodiment 3 of the present invention. An implementation principle and a technical effect of this embodiment are similar to those of any one of Embodiment 1, Embodiment 2, or Embodiment 3 and are not repeatedly described herein.

Figure 8:
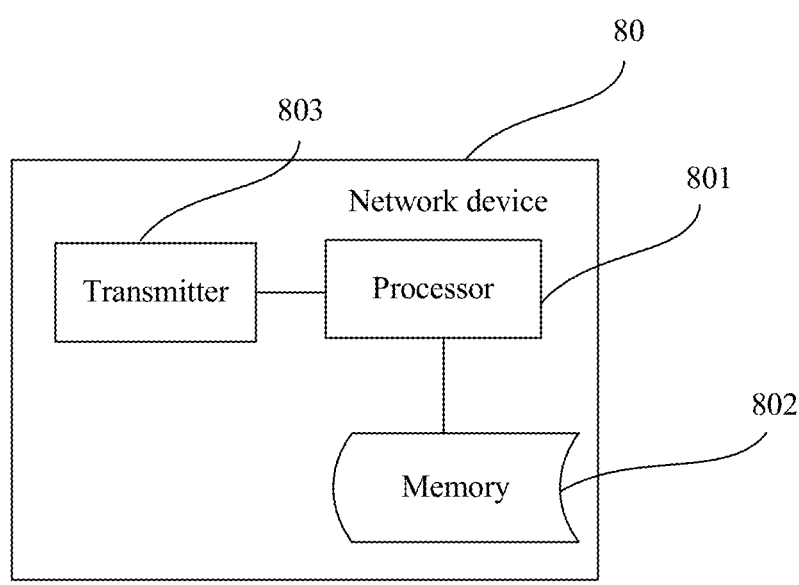
FIG. 8 is a schematic structural diagram of Embodiment 2 of a network device according to the present invention.

FIG. 8 is a schematic structural diagram of Embodiment 2 of a network device according to the present invention. As shown in FIG. 8, a network device 80 provided in this embodiment includes a processor 801 and a memory 802. The network device 80 may further include a transmitter 803. The transmitter 803 may be connected to the processor 801. The transmitter 803 is configured to transmit data or information. The memory 802 stores an execution instruction. When the network device 80 runs, the processor 801 communicates with the memory 802, and the processor 801 invokes the execution instruction in the memory 802, so as to execute the technical solution of the uplink power control method provided in either Embodiment 4 or Embodiment 5 of the present invention. An implementation principle and a technical effect of this embodiment are similar to those of either Embodiment 4 or Embodiment 5 and are not repeatedly described herein.

In the several embodiments provided in this application, it should be understood that the disclosed device and method may be implemented in another manner. For example, the described device embodiment is merely an example. For example, the unit or module division is merely logical function division and may be other division in actual implementation. For example, multiple units or modules may be combined or integrated into another system, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on multiple network units. Some or all the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network device uplink power control method, comprising:
    generating, by a network device, a $k^{th}$ measurement pilot, wherein k is an integer ranging from 1 to M, M is a total quantity of different measurement pilots configured in a serving cell, each of the M measurement pilots corresponds to a respective precoding matrix, and a $k^{th}$ precoding matrix corresponds to a beam having a direction and a width;
    sending, by the network device, the $k^{th}$ measurement pilot using a radio resource control (RRC) signaling; and
    sending, by the network device, a first power control parameter out of a plurality of power control parameters, wherein the first power control parameter corresponds to the beam, and the first power control parameter is usable to control an uplink transmit power of a first terminal device in a serving cell.

2. The method according to claim 1, wherein power control parameter configurations of terminal devices that receive a same measurement pilot configuration are the same, and the terminal devices include the first terminal device.

3. The method according to claim 1, wherein the first power control parameter comprises at least one of a target receive power, a path loss compensation factor, or a transmit format compensation term of the terminal device.

4. The method according to claim 1, wherein the terminal device controls, according to the first power control parameter, total physical uplink shared channel (PUSCH) transmit power of the terminal device to meet the following:

at a transmission moment i, when the terminal device performs PUSCH transmission but does not perform physical uplink control channel (PUCCH) transmission in a serving cell c, $$P_{PUSCH,c}(i) = \min\left\{\begin{array}{l}P_{CMAX,c}(i),\\ 10\log_{10}(M_{PUSCH,c}(i)) + P_{O\_PUSCH,c,k}(j) + \\ \alpha_{c,k}(j) \cdot PL_c + \Delta_{TF,c,k}(i) + f_c(i)\end{array}\right\},$$

or at a transmission moment i, when the terminal device performs PUSCH transmission and also performs PUCCH transmission in the serving cell c, $$P_{PUSCH,c}(i) = \min\left\{\begin{array}{l}10\log_{10}(P_{CMAX,c}(i) - P_{PUCCH}(i)),\\ 10\log_{10}(M_{PUSCH,c}(i)) + P_{O\_PUSCH,c,k}(j) + \\ \alpha_{c,k}(j) \cdot PL_c + \Delta_{TF,c,k}(i) + f_c(i)\end{array}\right\},$$

wherein $P_{CMAX,c}(i)$ is maximum transmit power of the terminal device in the serving cell c; and $M_{PUSCH,c}(i)$ is a quantity, in a unit of physical resource block (PRB), of PUSCH scheduling resource blocks of the terminal device at the transmission moment i, wherein i is an integer greater than or equal to o, and c is an integer greater than or equal to o;

$P_{O\_PUSCH,c,k}(j)$ comprises $P_{O\_NOMINAL\_PUSCH,c,k}(j)$ and $P_{O\_UE\_PUSCH,c,k}(j)$, and is used to represent the target receive power of the terminal device and is semi-statically configured by using higher layer RRC signaling; and when the measurement pilot received by the terminal device is the $k^{th}$ measurement pilot in the serving cell, $P_{O\_NOMINAL\_PUSCH,c,k}(j)$ is the first power control parameter corresponding to the $k^{th}$ measurement pilot;

when the configured measurement pilot received by the terminal device is the $k^{th}$ measurement pilot in the serving cell, $\alpha_{c,k}(j)$ represents a path loss compensation factor parameter in the first power control parameter corresponding to the $k^{th}$ measurement pilot and is semi-statically configured by using higher layer RRC signaling;

$PL_c$ is a path loss measurement value, based on reference signal received power (RSRP), of a terminal;

$\Delta_{TF,c,k}(i) = 10\log_{10}((2^{BPRE \cdot K_{s,k}} - 1) \cdot \beta_{offset}^{PUSCH})$ is a power adjustment value in different modulation and coding schemes, wherein when the configured measurement pilot received by the terminal device is the $k^{th}$ measurement pilot in the serving cell, $K_{s,k}$ is the first power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the terminal device and a quantity of resource elements (REs) allocated to the data of the terminal device; and $f_c(i)$ is a closed-loop power adjustment amount and is a feedback value that is quantized by a receive end according to a receive error or a measurement error.

5. The method according to claim 4, wherein the terminal device controls, according to the first power control parameter, total physical uplink control channel (PUCCH) transmit power of the terminal device to meet the following:

at a transmission moment i, the total PUCCH transmit power of the terminal device in the serving cell c is:

$$P_{PUCCH}(i) = \min\left\{\begin{array}{l}P_{CMAX,c}(i),\\ P_{0\_PUCCH,k} + PL_c + h(n_{CQI}, n_{HARQ}, n_{SR}) + \\ \Delta_{F\_PUCCH}(F) + \Delta_{TxD}(F') + g(i)\end{array}\right\},$$

wherein $P_{0\_PUCCH,k}$ comprises $P_{O\_NOMINAL\_PUCCH,k}$ and $P_{O\_UE\_PUCCH,k}$, and when the configured measurement pilot received by the terminal device is the $k^{th}$ measurement pilot in the serving cell, $P_{O\_NOMINAL\_PUCCH,k}$ represents the first power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by the network device.

6. The method according to claim 4, wherein the terminal device controls, according to the first power control parameter, total sounding reference signal (SRS) transmit power to meet the following:

at a transmission moment i, the total SRS transmit power of the terminal device in the serving cell c is:

$$P_{SRS,c}(i) = \min\left\{\begin{array}{l}P_{CMAX,c}(i),\\ P_{SRS\_OFFSET,c}(m) + 10\log_{10}(M_{SRS,c}) + \\ P_{O\_PUSCH,c,k}(j) + \alpha_{c,k}(j) \cdot PL_c + f_c(i)\end{array}\right\},$$

wherein $P_{O\_PUSCH,c,k}(j)$ comprises $P_{O\_NOMINAL\_PUSCH,c,k}(j)$ and $P_{O\_UE\_PUSCH,c,k}(j)$, and is used to represent the target receive power of the terminal device and is semi-statically configured by using higher layer RRC signaling; and when the configured measurement pilot received by the terminal device is the $k^{th}$ measurement pilot in the serving cell, $P_{O\_NOMINAL\_PUSCH,c,k}(j)$ is the first power control parameter corresponding to the $k^{th}$ measurement pilot;

when the configured measurement pilot received by the terminal device is the $k^{th}$ measurement pilot in the serving cell, $\alpha_{c,k}(j)$ represents a path loss compensation factor parameter in the first power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the terminal device.

7. A network device, comprising:
a processor and a non-transitory memory, wherein the non-transitory memory stores an execution instruction; and when the network device runs, the processor communicates with the non-transitory memory, and the processor executes the execution instruction to enable the network device to perform the following steps:
generating a $k^{th}$ measurement pilot, wherein k is an integer ranging from 1 to M, M is a total quantity of different measurement pilots configured in a serving cell, each of the M measurement pilots corresponds to a respective precoding matrix, and a $k^{th}$ precoding matrix corresponds to a beam having a direction and a width;
sending the $k^{th}$ measurement pilot using a radio resource control (RRC) signaling; and
sending a first power control parameter out of a plurality of power control parameters, wherein the first power control parameter corresponds to the beam, and the first power control parameter is usable to control uplink transmit power of a first terminal device in a serving cell.

8. The network device according to claim 7, wherein power control parameter configurations of terminal devices that receive a same measurement pilot configuration are the same, and the terminal devices include the first terminal device.

9. The network device according to claim 7, wherein the first power control parameter comprises at least one of a target receive power, a path loss compensation factor, or a transmit format compensation term of the terminal device.

10. The network device according to claim 7, wherein the terminal device controls, according to the first power control parameter, total physical uplink shared channel (PUSCH) transmit power of the terminal device to meet the following:
at a transmission moment i, when the terminal device performs PUSCH transmission but does not perform physical uplink control channel (PUCCH) transmission in a serving cell c, $$P_{PUSCH,c}(i) = \min\left\{\begin{array}{l} P_{CMAX,c}(i), \\ 10\log_{10}(M_{PUSCH,c}(i)) + P_{O\_PUSCH,c,k}(j) + \\ \alpha_{c,k}(j) \cdot PL_c + \Delta_{TF,c,k}(i) + f_c(i) \end{array}\right\},$$

or
at a transmission moment i, when the terminal device performs PUSCH transmission and also performs PUCCH transmission in the serving cell c, $$P_{PUSCH,c}(i) = \min\left\{\begin{array}{l} 10\log_{10}(P_{CMAX,c}(i) - P_{PUCCH}(i)), \\ 10\log_{10}(M_{PUSCH,c}(i)) + P_{O\_PUSCH,c,k}(j) + \\ \alpha_{c,k}(j) \cdot PL_c + \Delta_{TF,c,k}(i) + f_c(i) \end{array}\right\},$$

wherein
$P_{CMAX,c}(i)$ is maximum transmit power of the terminal device in the serving cell c; and $M_{PUSCH,c}(i)$ is a quantity, in a unit of physical resource block (PRB), of PUSCH scheduling resource blocks of the terminal device at the transmission moment i, wherein i is an integer greater than or equal to o, and c is an integer greater than or equal to o;

$P_{O\_PUSCH,c,k}(j)$ comprises $P_{O\_NOMINAL\_PUSCH,c,k}(j)$ and $P_{O\_UE\_PUSCH,c,k}(j)$, and is used to represent the target receive power of the terminal device and is semi-statically configured by using higher layer RRC signaling; and when the measurement pilot received by the terminal device is the $k^{th}$ measurement pilot in the serving cell, $P_{O\_NOMINAL\_PUSCH,c,k}(j)$ is the first power control parameter corresponding to the $k^{th}$ measurement pilot;

when the configured measurement pilot received by the terminal device is the $k^{th}$ measurement pilot in the serving cell, $\Delta_{c,k}(j)$ represents a path loss compensation factor parameter in the first power control parameter corresponding to the $k^{th}$ measurement pilot and is semi-statically configured by using higher layer RRC signaling;

$PL_c$ is a path loss measurement value, based on reference signal received power RSRP, of a terminal;

$\Delta_{TF,c,k}(i)=10\log_{10}((2^{BPRE \cdot K_{s,k}}-1)\cdot\beta_{offset}^{PUSCH})$ is a power adjustment value in different modulation and coding schemes, wherein when the configured measurement pilot received by the terminal device is the $k^{th}$ measurement pilot in the serving cell, $K_{s,k}$ is the first power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the terminal device and a quantity of resource elements REs allocated to the data of the terminal device; and $f_c(i)$ is a closed-loop power adjustment amount and is a feedback value that is quantized by a receive end according to a receive error or a measurement error.

11. The network device according to claim 10, wherein the terminal device controls, according to the first power control parameter, total physical uplink control channel (PUCCH) transmit power of the terminal device to meet the following:
at a transmission moment i, the total PUCCH transmit power of the terminal device in the serving cell c is:

$$P_{PUCCH}(i) = \min\left\{\begin{array}{l} P_{CMAX,c}(i), \\ P_{0\_PUCCH,k} + PL_c + h(n_{CQI}, n_{HARQ}, n_{SR}) + \\ \Delta_{F\_PUCCH}(F) + \Delta_{TxD}(F') + g(i) \end{array}\right\},$$

wherein
$P_{O\_PUCCH,k}$ comprises $P_{O\_NOMINAL\_PUCCH,k}$ and $P_{O\_UE\_PUCCH,k}$, and when the configured measurement pilot received by the terminal device is the $k^{th}$ measurement pilot in the serving cell, $P_{O\_NOMINAL\_PUCCH,k}$ represents the first power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and g(i) is a closed-loop power control adjustment value and is determined according to a power control command sent by the network device.

12. The network device according to claim 10, wherein the terminal device controls, according to the first power control parameter, total sounding reference signal (SRS) transmit power to meet the following:

at a transmission moment i, the total SRS transmit power of the terminal device in the serving cell c is:

$$P_{SRS,c}(i) = \min\begin{Bmatrix} P_{CMAX,c}(i), \\ P_{SRS\_OFFSET,c}(m) + 10\log_{10}(M_{SRS,c}) + \\ P_{O\_PUSCH,c,k}(j) + \alpha_{c,k}(j) \cdot PL_c + f_c(i) \end{Bmatrix},$$

wherein $P_{O\_PUSCH,c,k}(j)$ comprises $P_{O\_NOMINAL\_PUSCH,c,k}(j)$ and $P_{O\_UE\_PUSCH,c,k}(j)$, and is used to represent the target receive power of the terminal device and is semi-statically configured by using higher layer RRC signaling; and when the configured measurement pilot received by the terminal device is the $k^{th}$ measurement pilot in the serving cell, $P_{O\_NOMINAL\_PUSCH,c,k}(j)$ is the first power control parameter corresponding to the $k^{th}$ measurement pilot;

when the configured measurement pilot received by the terminal device is the $k^{th}$ measurement pilot in the serving cell, $\alpha_{c,k}(j)$ represents a path loss compensation factor parameter in the first power control parameter corresponding to the $k^{th}$ measurement pilot and is semi-statically configured by using higher layer RRC signaling;

$P_{SRS\_OFFSET,c}(m)$ represents an offset, caused by different modulation and coding schemes, of SRS transmit power relative to PUSCH transmit power; and $M_{SRS,c}$ represents SRS transmission bandwidth of the terminal device.

13. A non-transitory computer readable storage medium, wherein the computer readable storage medium stores a program, and when program is executed by a processor, the following steps are performed:

generating a $k^{th}$ measurement pilot, wherein k is an integer ranging from 1 to M, M is a total quantity of different measurement pilots configured in a serving cell, each of the M measurement pilots corresponds to a respective precoding matrix, and a $k^{th}$ precoding matrix corresponds to a beam having a direction and a width;

sending the $k^{th}$ measurement pilot using a radio resource control (RRC) signaling; and sending a first power control parameter out of a plurality of power control parameters, wherein the first power control parameter corresponds to the beam, and the first power control parameter is usable to control uplink transmit power of a first terminal device in a serving cell.

14. The non-transitory computer readable storage medium according to claim 13, wherein power control parameter configurations of terminal devices that receive a same measurement pilot configuration are the same, and the terminal devices include the first terminal device.

15. The non-transitory computer readable storage medium according to claim 13, wherein the first power control parameter comprises at least one of a target receive power, a path loss compensation factor, or a transmit format compensation term of the terminal device.

16. The non-transitory computer readable storage medium according to claim 13, wherein the terminal device controls, according to the first power control parameter, total physical uplink shared channel (PUSCH) transmit power of the terminal device to meet the following:

at a transmission moment i, when the terminal device performs PUSCH transmission but does not perform physical uplink control channel (PUCCH) transmission in a serving cell c, $$P_{PUSCH,c}(i) = \min\begin{Bmatrix} P_{CMAX,c}(i), \\ 10\log_{10}(M_{PUSCH,c}(i)) + P_{O\_PUSCH,c,k}(j) + \\ \alpha_{c,k}(j) \cdot PL_c + \Delta_{TF,c,k}(i) + f_c(i) \end{Bmatrix},$$

or at a transmission moment i, when the terminal device performs PUSCH transmission and also performs PUCCH transmission in the serving cell c, $$P_{PUSCH,c}(i) = \min\begin{Bmatrix} 10\log_{10}(P_{CMAX,c}(i) - P_{PUCCH}(i)), \\ 10\log_{10}(M_{PUSCH,c}(i)) + P_{O\_PUSCH,c,k}(j) + \\ \alpha_{c,k}(j) \cdot PL_c + \Delta_{TF,c,k}(i) + f_c(i) \end{Bmatrix},$$

wherein $P_{CMAX,c}(i)$ is maximum transmit power of the terminal device in the serving cell c; and $M_{PUSCH,c}(i)$ is a quantity, in a unit of physical resource block (PRB), of PUSCH scheduling resource blocks of the terminal device at the transmission moment i, wherein i is an integer greater than or equal to o, and c is an integer greater than or equal to o;

$P_{O\_PUSCH,c,k}(j)$ comprises $P_{O\_NOMINAL\_PUSCH,c,k}(j)$ and $P_{O\_UE\_PUSCH,c,k}(j)$, and is used to represent the target receive power of the terminal device and is semi-statically configured by using higher layer RRC signaling; and when the measurement pilot received by the terminal device is the $k^{th}$ measurement pilot in the serving cell, $P_{O\_NOMINAL\_PUSCH,c,k}(j)$ is the first power control parameter corresponding to the $k^{th}$ measurement pilot;

when the configured measurement pilot received by the terminal device is the $k^{th}$ measurement pilot in the serving cell, $\alpha_{c,k}(j)$ represents a path loss compensation factor parameter in the first power control parameter corresponding to the $k^{th}$ measurement pilot and is semi-statically configured by using higher layer RRC signaling;

$PL_c$ is a path loss measurement value, based on reference signal received power (RSRP), of a terminal;

$\Delta_{TF,c,k}(i)=10\log_{10}((2^{BPRE \cdot K_{s,k}}-1) \cdot \beta_{offset}^{PUSCH})$ is a power adjustment value in different modulation and coding schemes, wherein when the configured measurement pilot received by the terminal device is the $k^{th}$ measurement pilot in the serving cell, $K_{s,k}$ the first power control parameter corresponding to the $k^{th}$ measurement pilot and is semi-statically configured by using higher layer RRC signaling, $\beta_{offset}^{PUSCH}$ is a parameter configured by a higher layer, and BPRE is obtained by calculating a quantity of bits carried in data of the terminal device and a quantity of resource elements (REs) allocated to the data of the terminal device; and $f_c(i)$ is a closed-loop power adjustment amount and is a feedback value that is quantized by a receive end according to a receive error or a measurement error.

17. The non-transitory computer readable storage medium according to claim 13, wherein the terminal device controls, according to the first power control parameter, total physical uplink control channel (PUCCH) transmit power of the terminal device to meet the following:

at a transmission moment i, the total PUCCH transmit power of the terminal device in a serving cell c is:

$$P_{PUCCH}(i) = \min \left\{ \begin{array}{l} P_{CMAX,c}(i), \\ P_{0\_PUCCH,k} + PL_c + h(n_{CQI}, n_{HARQ}, n_{SR}) + \\ \Delta_{F\_PUCCH}(F) + \Delta_{TxD}(F') + g(i) \end{array} \right\}$$

wherein $P_{0\_PUCCH,k}$ comprises $P_{O\_NOMINAL\_PUCCH,k}$ and $P_{O\_UE\_PUCCH,k}$, and when the configured measurement pilot received by the terminal device is the $k^{th}$ measurement pilot in the serving cell, $P_{O\_NOMINAL\_PUCCH,k}$ represents the first power control parameter corresponding to the $k^{th}$ measurement pilot and is semi-statically configured by using RRC signaling;

$\Delta_{F\_PUCCH}(F)$ is a power control adjustment parameter related to a PUCCH format and is determined according to a parameter configured by a higher layer;

$h(n_{CQI}, n_{HARQ}, n_{SR})$ is a variable related to PUCCH transmission information;

$\Delta_{TxD}(F')$ is a parameter related to a quantity of antenna ports for PUCCH sending and a PUCCH transmission mode; and $g(i)$ is a closed-loop power control adjustment value and is determined according to a power control command sent by a network device.

18. The method according to claim 1, wherein
a second power control parameter for a second measurement pilot is different from the first power control parameter, and the second measurement pilot is different from the $k^{th}$ measurement pilot.

19. The method according to claim 1, wherein the first power control parameter is used to control total physical uplink shared channel (PUSCH) transmit power of the terminal device.

20. The network device according to claim 7, wherein
a second power control parameter for a second measurement pilot is different from the first power control parameter, and the second measurement pilot is different from the $k^{th}$ measurement pilot.

21. The network device according to claim 7, wherein
the first power control parameter is used to control total physical uplink shared channel (PUSCH) transmit power of the terminal device.

22. The non-transitory computer readable storage medium according to claim 13, wherein
a second power control parameter for a second measurement pilot is different from the first power control parameter, and the second measurement pilot is different from the $k^{th}$ measurement pilot.

23. The non-transitory computer readable storage medium according to claim 13, wherein
the first power control parameter is used to control total physical uplink shared channel (PUSCH) transmit power of the terminal device.

* * * * *

UNITED STATES PATENT AND TRADEMARK OFFICE
CERTIFICATE OF CORRECTION

PATENT NO. : 10,917,854 B2
APPLICATION NO. : 16/117410
DATED : February 9, 2021
INVENTOR(S) : Liu Page 1 of 1

It is certified that error appears in the above-identified patent and that said Letters Patent is hereby corrected as shown below:

In the Claims

In Column 48, Line 15, Claim 10, delete "$\Delta_{c,k}(j)$" and insert -- $\alpha_{c,k}(j)$ --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*